United States Patent [19]
Good

[11] 3,762,737
[45] Oct. 2, 1973

[54] FOLDABLE CART WITH SEAT

[76] Inventor: Milton W. Good, 147-37 Ash Ave., Flushing, N.Y.

[22] Filed: Nov. 2, 1971

[21] Appl. No.: 194,871

[52] U.S. Cl. ........................ 280/36 C, 280/DIG. 6
[51] Int. Cl. ............................................. B62b 11/00
[58] Field of Search ............. 280/36 R, 36 C, 41 C, 280/41 R, DIG. 6; 297/16

[56] References Cited
UNITED STATES PATENTS
| | | | |
|---|---|---|---|
| 3,291,502 | 12/1966 | England | 280/41 C |
| 2,660,446 | 11/1953 | Edhardt | 280/36 R |
| 2,658,703 | 11/1953 | Brink | 280/36 C |

Primary Examiner—Leo Friaglia
Assistant Examiner—Robert R. Song
Attorney—Robert E. Burns et al.

[57] ABSTRACT

A foldable golf cart has means for carrying golf clubs and a stool-height seat extending the full width of the cart. Legs and also wheels are provided at opposite sides of a main frame that supports its seat and a third leg pivotally connected to the frame at its top holds the foldable club carrying means in operative position, a foldable handle extends forwardly and upwardly from the frame.

11 Claims, 9 Drawing Figures

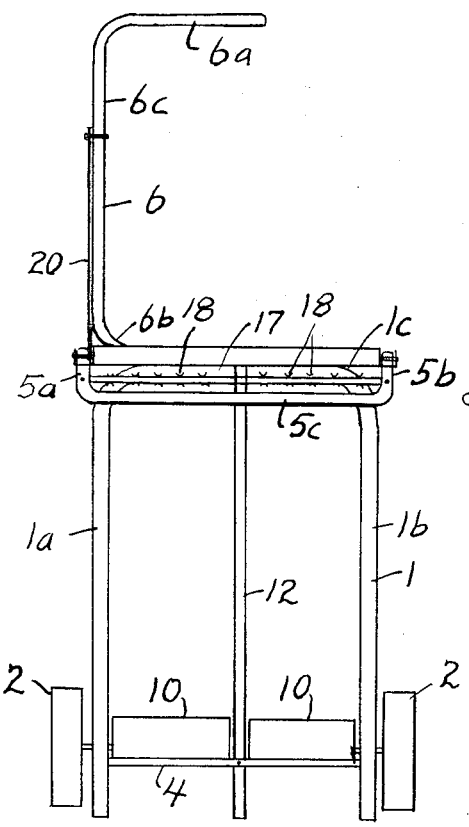
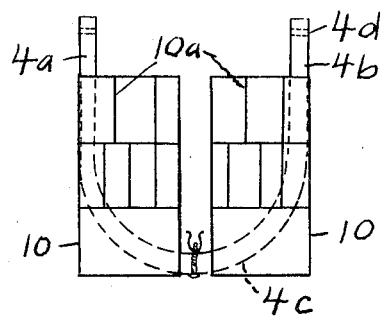
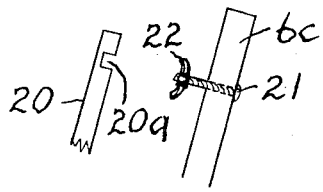
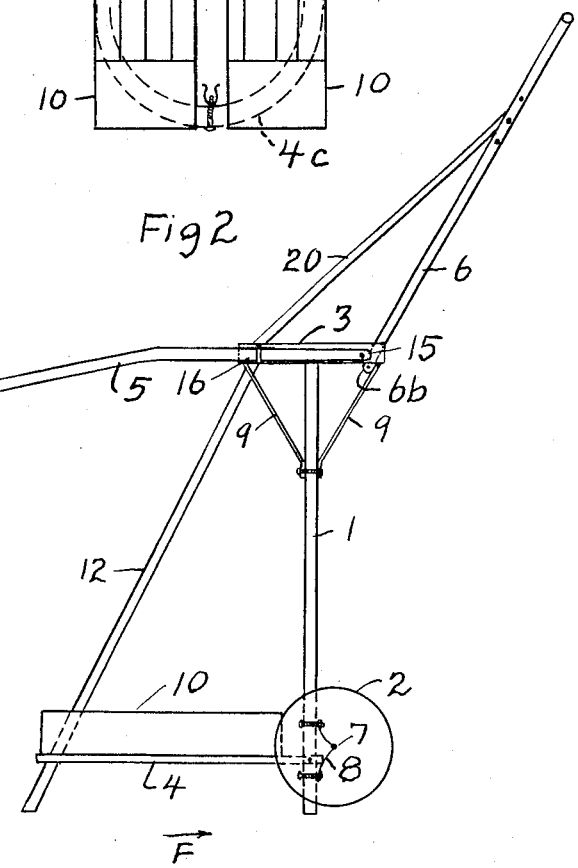
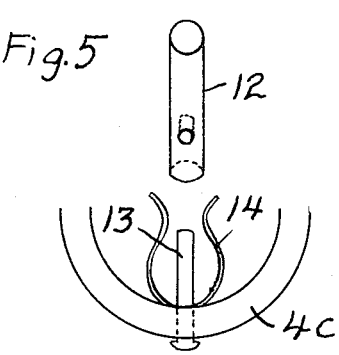
July 15, 1971
Milton W. Good,

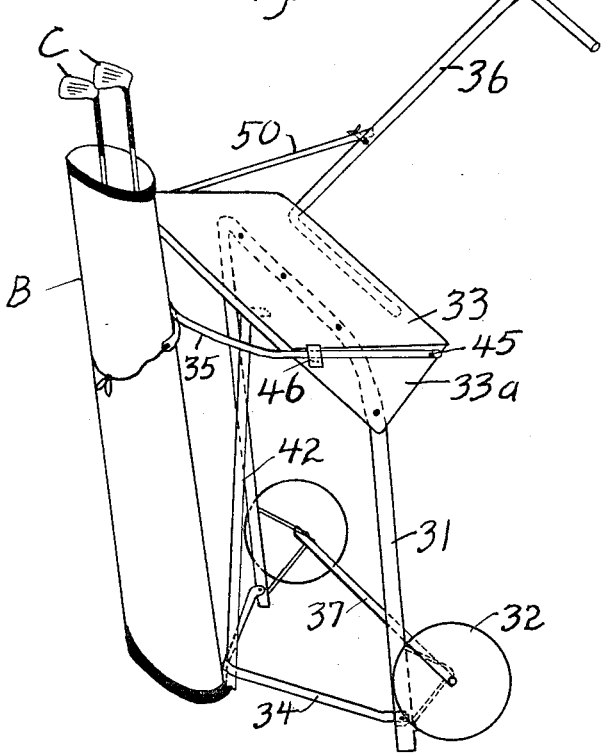
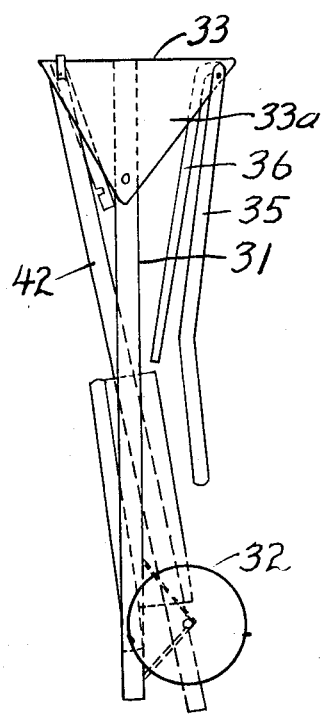
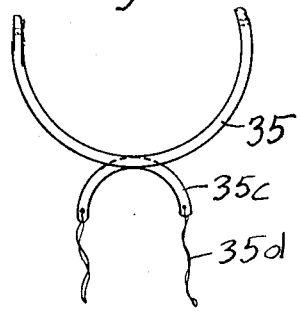
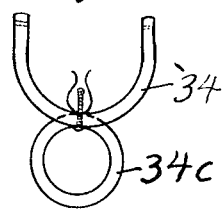

FOLDABLE CART WITH SEAT

The present invention relates to a combination cart and seat which is particularly suitable for use by golfers to carry their golf clubs and to provide a seat for resting while waiting on the golf course.

Public golf courses and even the golf courses of private clubs have become so crowded, particularly on weekends and holidays, that is is frequently necessary for players to wait at each hole or even between successive strokes before they can proceed. Standing around while waiting for the preceding players to play ahead is very tiring, even more tiring than walking. The result is that a round of golf has become quite fatiguing.

Combination type cart and seats for use by golfers have heretofore been proposed but have not gained popularity. This appears to be explained by the fact that they are not convenient to use. Some have a low chair-height seat so that the effort of sitting down and getting up many times during a game is more tiring than standing up. With some, it is necessary to walk around the cart from one side to the other when it is desired to sit down. Some have not been foldable for transportation or storage or have been foldable only with difficulty. For these and perhaps other reasons, combination carts and seats have not come into wide use by golfers.

It is an object of the present invention to provide a combination cart and seat which is easily and quickly foldable for transportation and storage, provides convenient means for carrying golf clubs or other objects and provides a seat which is comfortable and is convenient to use. The cart is provided with a handle by which it can easily be pulled. When a user of the cart desires to rest, he merely sits down on the seat without walking around the cart and without even turning around. Moreover, the seat is sufficiently high that a user can sit on it and take his weight off of his feet with only a slight bending of the knees so that he avoids the effort of sitting on a low seat and getting up again. By reason of its simple and light-weight construction, the combination cart and seat in accordance with the invention is inexpensive to manufacture and is durable in use.

The objects and advantages of the invention will be more fully understood from the following description in conjunction with the accompanying drawings in which:

FIG. 1 is a schematic front view of a combination cart and seat in accordance with the invention, FIG. 2 is a schematic side view FIG. 3, is a schematic plan of a lower support suitable for golf clubs, FIGS. 4 and 5 are schematic detailed views showing fastening means, FIG. 6 is a schematic perspective view showing a modification, FIG. 7 is a side view of the cart in folded condition, FIG. 8 is a schematic plan of an upper golf bag support and, FIG. 9 is a schematic view on a smaller scale of a lower support.

The combination cart and seat shown by way of example in FIGS. 1 to 5 comprises a normally vertical frame 1, a pair of wheels 2 at the lower end of the frame, a transversely extending seat 3 at the upper end of the frame, a lower support 4 pivotally connected to the lower portion of the frame, an upper support 5 pivotally connected to the upper portion of the frame and a handle 6 which extends upwardly and forwardly from the frame 1. For convenience of description, the forward direction is herein referred to as the direction indicated by the arrow F in FIG. 2 it being understood however that the cart can go in either direction.

The frame 1 is shown as comprising a piece of tubing bent in a generally U-shape to provide downwardly extending forward leg portions 1a and 1b connected by a transversely extending upper portion 1c. The wheels 2 are rotatably mounted at opposite sides of the lower portion of the frame by means of an axle 7 which extends transversely across the frame 1 and is secured to opposite leg portions 1a and 1b by suitable brackets 8. It will be noted that the axle 7 of the wheels 2 is offset forwardly from the legs of the frame and that the frame legs extend downwardly below the axle. When the frame 1 is in a normally vertical position as shown in FIG. 2, the lower ends of the frame legs 1a and 1b engage the ground and the wheels 2 are lifted slightly off of the ground. When the cart is tipped forwardly in the direction of the arrow F, the wheels 2 come into engagement with the ground and the legs of the frame are lifted off of the ground so that the cart can roll on the wheels. The wheels are preferably provided with rubber tires.

The seat 3 is shown as comprising a sheet metal member having a flat upper surface and end edge portions that are bent downwardly so as to form flanges which strengthen and rigidify the seat. A cushion or padding is preferably provided on the seat to make it more comfortable. The seat 3 is mounted on the cross-bar portion 1c of the frame 1 and is braced by braces 9 which are secured to the leg portions 1a and 1b as seen in FIG. 2. As thus assembled, the seat 3 and frame 1 comprise a unitary structure so that for the purpose of mounting pertinent components the seat 3 may be considered as part of the frame.

The lower support 4 is shown as comprising a piece of tubing that in U-shape so as to provide opposite arms 4a and 4b connected by a curved portion 4c. Holes 4d are provided near the ends of opposite arms 4a and 4b for the purpose of pivotally connecting the support member 4 to opposite legs of the frame 1 by simple pivot pins. As seen in FIG. 2, the pivotal connection of the support member 4 to the frame 1 is above the lower ends of opposite legs of the frame. The lower support further comprises two trays 10 which are mounted on and supported by the tubular support member 4 as seen in FIGS. 1, 2 and 3. The trays 10 are suitably molded of plastic or formed of sheet metal and are provided with partitions 10a which divide the trays into a number of individual compartments designed to receive the heads of golf clubs or other articles. By reason of its pivotal mounting on the frame, the support 4 with the trays 10 can be swung from the operative position shown in FIGS. 1 and 2 to a folded condition in which the support 4 is vertical and disposed between the opposite legs of the frame 1. The support 4 is releasably held in the approximately horizontal operative position shown in FIGS. 2 by means of a central rear leg or strut 12 which is pivotally connected to the frame at the rear central portion of the seat 3. By reason of its pivotal mounting, the strut 12 is swingable between the operative position shown in FIG. 2 and a folded position in which it extends down along the rear side of the folded support 4. When in operative position, the strut 12 is releasably secured to the rounded central portion 4c of the lower support 4. The securing means is shown by way of example as comprising a pin 13 extending through the curved portion 4c of the support member 4 and extending into a hole 12a provided in the strut 12. A spring clip 14 embraces the strut 12 so as releasably to retain it in engagement with the pin 13. There is thus provided an effective coupling which is easily engaged and disengaged as desired. It will be seen that the lower end of the strut 12 extends down below the support member 4 so as to engage the ground on which the cart rests. Thus, when the support 12 is in operative position, the seat 3 is supported by three legs comprising the legs 1a and 1b of the frame 1 and the strut 12. As will be seen in FIG. 3 the two trays 10 are spaced sufficiently apart to receive the strut 12 between them.

The upper support 5 is shown as comprising a piece of tubing bent into U-shape so as to provide opposite arm portions 5a and 5b connected by a transverse rear portion 5c. As seen in FIG. 2 the arms 5a and 5b are bent slightly so that the forward part is approximately horizontal while the rearward part slopes downwardly. The opposite arms 5a and 5b of the upper support 5 extend along the opposite ends of the seat 3 and are pivotally connected near the front of the seat by pivot pins 15. The pivotal connection provides for swinging the support 5 from the approximately horizontal rearwardly extending position shown in FIG. 2 to a forward position in which the support 5 extends downwardly along the forward side of the frame 1. When in operative position, the frame 5 is supported by the pivot pins 15 and by brackets 16 at opposite ends of the seat 3 near the rear side. The brackets 16 can be in the form of angles or channels and may, if desired, be formed integrally with the seat 3. While U-shaped resilient brackets can be used to grip the support 5 and hold it in operative position, it has been found that this is not necessary as the support is retained in operative position by its own weight. When the cart is to be used for carrying golf clubs, the upper support 5 is provided with suitable means for holding the shafts of clubs the heads of which are received in the trays 10 of the lower support. By way of example, there is shown schematically in 1 a cross-bar 17 which extends between the opposite arms of the support 5. A plurality of spring clips 18 mounted on the cross-bar 17 are arranged to receive and releasably hold the shafts of the clubs. These clips can, for example, be spring clips similar to the spring clip 14 shown in FIG. 5 and are of a suitable size for holding the club shafts. Thus a golf club is conveniently placed in the part merely by putting the head of the club into one of the compartments of one of the trays 10 and snapping the shaft of the club into the corresponding clip 18.

The handle 6 is shown as comprising a piece of tubing bent to U-shape so as to provide a shorter arm 6a, a longer arm 6b and a connecting portion 6c. The longer arm 6b is rotatably mounted on the under side of the seat 3 near the forward edge by means of suitable brackets or bearing members. The rotatable mounting of the handle permits it to swing from the operative position shown in FIGS. 1 and 2 to a folded position in which it extends down along the forward side of the frame 1. The handle 6 is releasably held in operative position by means of a brace 20, one end of which is pivotally connected at one end of the seat near the rear while the other is releasably secured to the connecting portion 6c of the handle 6, for example by means of a small bolt 20 which extends through the handle portion 6c and is provided with a wing nut 22. The bolt 21 is received in a hole or notch 20a provided near the end of the brace member 20. To provide for fixing the handle 6 at different heights, it may be provided with a plurality of spaced holes to receive the bolt 21 as illustrated in FIG. 2. The handle 6 and brace 20 can be easily and quickly folded merely by loosening the wing nut 22 and swinging the handle and brace down into positions along side the frame 1, When the lower support 4, the upper support 5, the strut 12, handle 6 and brace 20 are in folded position, the cart is very compact and it can be stored or transported in a small space, for example in the trunk of a car.

When the cart is to be used on a golf course, the player's golf clubs are placed head down into the several compartments of the trays 10 of the lower support while the shafts of the clubs are snapped into respective spring clips 18 of the upper support 5. When the cart is stationary, it is supported on the ground in an upright position by the legs of the frame 1 and the strut 12. When the cart is pulled forwardly by means of the handle 6, it tips forwardly so that the legs of the frame 1 and the strut 12 are lifted off the ground permitting the cart to roll on the wheels 2. If a golfer wishes to rest, he merely stops the cart, permits it to assume the upright position shown in FIG. 2 and sits on the seat 3. The seat is of such height that a golfer can rest on it and take his weight off his feet with only slight bending of the knees. For men of average stature the height of the seat may be about 30 inches from the ground while for children and women it may be somewhat lower, for example approximately 26 inches. The width of the cart is sufficient to provide stability both when the cart is in motion and when it is being used as a seat. On the other hand, in order to provide a compact package, it should not be excessively wide. It has been found that for average use, a width of 20 to 24 inches is preferable.

In FIGS. 6–9, there is shown a combination cart and seat which is similar to that shown in FIGS. 1–5 but is designed to carry golf clubs in a bag rather than individually. Corresponding portions of the combined cart and seat shown in FIGS. 6 to 9 are designated by the same reference numeral as in FIGS. 1–5 with the addition of 30. Thus, the embodiment shown in FIGS. 6–9 comprises a frame 31, wheels 32, a seat 33, lower support 34, upper support 35 and pivotally mounted handle 36. The wheels 32 are rotatably mounted on a transversely extending axle 37 mounted on lower portions of the frame 31 by means of brackets 38. The lower support 34 is releasably held in operative position by means of a strut 42 pivotally secured to a rear central portion of the seat 33. The upper support 35 is pivotally mounted at 45 near the front of the seat 33 and is supported by brackets 46 near the rear side of the seat. The handle 36 is releasably held in operative position by a pivoted brace 50 as previously described.

Triangular shaped end portions 33a of the seat 33 are bent down and secured to the opposite legs of the frame 31 to brace the seat relative to the frame instead of using separate braces such as the braces 9 in FIG. 2. A portion of the end material is partially severed and bent out to form the brackets 46.

The lower support 34 is formed with a central loop portion 34c which is designed to receive and support the lower end of the golf bag B as seen in FIG. 6. The upper support 35 is provided with curved arm portions 35c forming a semicircular craddle adapted to receive an upper portion of the golf bag which is retained by flexible cords or straps 35d. Golf clubs C are placed in the bag B in the usual manner. The combination cart and seat is shown in operative position in FIG. 6 and in folded condition in FIG. 7. It will be seen when folded it presents a very compact package. Except as otherwise described, the combination cart and seat shown in FIGS. 6-9 is constructed like that of FIGS. 1-5 and operates in like manner.

While two embodiments of the invention have been shown by way of example in the drawings it will be understood that corresponding features of the two embodiments are mutually interchangeable and that other changes in size, shape and details of construction may be made. Moreover, while the combination cart and seat in accordance with the invention is particularly suitable for use by golfers and has hence been shown as a golf cart, it can be used for other purposes, as for example a shopping cart, with suitable modification of the supporting structures to adapt them to the particular kind of merchandise or articles to be carried.

What I claim and desire to secure by letters patent is:

1. A foldable cart with a seat, comprising an elongate approximately horizontal transversely extending seat structure, a pair of front legs extending downwardly at opposite ends of said seat structure and rigid therewith, said legs being disposed intermediate front and rear edges of said seat structure, a rear leg pivotally connected with said seat structure and swingable between a folded position approximately parallel with said front legs and an operative position in which it extends downwardly and rearwardly at an angle to said front legs, said seat being stably supported by said front and rear legs when said rear leg is in operative position, a lower article support pivotally supported near the lower end portions of said front legs to swing about a horizontal axis between a folded position in which it is disposed approximately vertically between said front legs and an operative position in which it extends approximately horizontally rearwardly from lower portions of said front legs, an upper support swingably mounted near upper portions of said front legs and swingable between a folded position in which it is approximately parallel with said front legs and an operative position in which it extends approximately horizontally rearwardly from upper portions of said front legs, a handle pivotally mounted at one end of said seat structure for pivotal movement between a folded position in which it extends down approximately along one front leg and an operative position in which it extends upwardly and forwardly from one end of said seat structure, means for releasably retaining said rear leg, said supports and said handle in operative position, a pair of wheels mounted on lower portions of said front legs for rotation about a horizontal transverse axis disposed forwardly of said front legs and above the lower ends of said front legs a distance slightly greater than the radius of said wheels so that when said seat structure is supported by said front and rear legs engaging the ground said wheels are off of the ground and when said cart is tilted forwardly, said wheels engage the ground and said legs are lifted off the ground, whereby said cart can be rolled on said wheels.

2. A cart according to claim 1, in which said upper support is pivotally connected to said seat structure at opposite ends thereof.

3. A cart according to claim 2, in which said upper support is pivotally connected to said seat structure at forward portions at opposite ends thereof, and in which said means for releasably retaining said upper support in operative position comprises bracket means at rearward portions at opposite ends of said seat structure engagable by said upper support when said upper support is swung to operative position.

4. A cart according to claim 1, in which said handle is pivotally connected to said seat structure at a forward portion of said seat structure, and in which means for retaining said handle in operative position comprises a brace pivotally connected at one end to said seat structure at a rearward portion of one end of said seat structure and means for releasably connecting the other end of said brace to said handle.

5. A cart according to claim 1, in which said means for releasably retaining said rear leg and lower support in operative position comprises interengaging means for securing a rear portion of said lower support with a lower portion of said rear leg.

6. A cart according to claim 1, in which an inverted U-shaped tubular member has opposite leg portions forming said front legs and a connecting transverse portion in part forming said seat structure, said seat structure further comprising a horizontal seat portion overlying and supported by said transverse portion of said tubular member.

7. A cart according to claim 6, further comprising braces at opposite ends of said seat structure rigidly securing said seat portion approximately perpendicular to said front leg portions.

8. A cart according to claim 7, in which said seat portion comprises sheet material and said braces comprise turned down end portions of said sheet material secured to said front legs.

9. A cart according to claim 1, in which said handle at its upper forward end has an inturned portion extending inwardly toward a central plane perpendicularly bisecting said seat structure.

10. A cart according to claim 9, in which said handle comprises a U-shaped tubular member having one leg parallel to and rotatably supported by said seat structure to form said pivotal mounting of said handle and an opposite leg forming said inturned end portion.

11. A cart according to claim 1, in which said cart is for carrying golf clubs and in which said lower support comprises a plurality of compartments for individually receiving heads of said clubs and said upper support comprises means for individually holding shafts of said clubs.

* * * * *